UNITED STATES PATENT OFFICE 2,641,593

POLYAMIDE RESINS

Howard M. Teeter and John C. Cowan, Peoria, Ill., assignors to United States of America as represented by the Secretary of Agriculture No Drawing. Application March 27, 1950, Serial No. 152,270

13 Claims. (Cl. 260—78)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the preparation of polyamide resins by reaction between a polycarboxylic acid substance and a polyamine.

In Patent No. 2,582,235, granted January 15, 1952, a synthetic resin is described, being the reaction product between an adduct of maleic anhydride with oleic acid or its esters and an organic diamine. The maleic anhydride adducts of polyunsaturated fat acid esters, for example methyl linoleate, rapidly produce gels when heated with diamines and are therefore unsuitable for polyamide formation. We have now found that citraconic anhydride and itaconic anhydride adducts with long chain or higher fatty acid compounds, particularly those containing more than one ethylenic bond, have much less tendency to gel during reaction with polyamines. For this reason a wider variety of polyamides is possible employing both a wider variety of fatty acid esters in adduct-formation and a wider variety of polyamines.

The polyamides of this invention are similar in property to Norelac-type polyamides. They have a molecular weight within the range of 2,000 to 5,000 depending upon the specific reactants and the time and temperature of reaction. The majority of products have a molecular weight of about 3,000. They are brown, translucent solids, soluble in the usual organic solvents, such as for example, isopropanol, chloroform, butanol and benzene.

As polycarboxylic acid substance, we employ the condensation adducts of unsaturated higher fatty acids or their aliphatic esters with a member of the group consisting of citraconic anhydride and itaconic anhydride. We may also employ the adduct obtained from a mixture of such higher fatty acids or their esters. Of particular interest is the mixture known in the trade as "monomeric distillate." This may be described as follows.

In the production of polymeric fat acids, as for example, by polymerizing fatty oils containing glycerides of polymerizable fat acids, such as soybean oil, linseed oil, cottonseed oil, perilla oil, dehydrated castor oil, and the like, and by eliminating the monomeric fraction, as for example by distillation, this monomeric fraction is formed in considerable amounts. In the case of soybean oil, it comprises 22–25 percent methyl esters of saturated acids, 18–25 percent methyl linoleate and 50–60 percent methyl oleate. Our invention makes possible the utilization of this monomeric fraction to produce a synthetic resin possessing valuable properties.

In accordance with this invention unsaturated higher fatty acids or their aliphatic esters, as for example methyl oleate, methyl linoleate, ethylene glycol monolinoleate, the monomeric distillate from the formation of polymeric fat acids and the like, are caused to react with citraconic anhydride or itaconic anhydride in accordance with the process of Ross et al. in Jour. of the Am. Chem. Soc. 65, pages 1373–6 (1946). This class of adducts is disclosed in U. S. Patent No. 2,188,888 granted to Clocker. It is preferred to prepare the adduct by the general procedure of Ross et al. except that instead of converting the crude adduct to the trimethyl ester, it may be used directly. For example, the two compounds may be mixed in the proper proportions as outlined by Ross et al. and heated for a few hours in an inert atmosphere at a temperature of about 200° C., and the adduct recovered from the reaction mixture. Recovery of the adduct from the reaction mixture is not necessary, however, and we prefer not to do so. One advantage of the present invention is that the crude adduct may be used directly in the polyamide reaction, without further purification or chemical treatment.

The higher fatty acid or ester may be replaced by mixtures, such as the monomeric distillates previously mentioned, and the adducts formed as described above. The resins are valuable as ingredients for paper coatings, as agents for moisture-proofing and laminating, and the like. They are useful in anticorrosive coatings for metal and for protective and decorative coatings, such as spirit varnishes, lacquers and the like.

In general, according to the invention, these adducts mentioned above are reacted with an organic aliphatic compound possessing at least two primary amino groups, such as polymethylene diamines, polyethylene polyamines, higher aliphatic polyamines possessing terminal primary amino groups and the like. Specific examples of such polyamines are ethylene diamine, propylene diamine, butylene diamine, hexamethylene diamine, diethylene triamine, and the polyoctadecapolyenylamines.

The reaction is carried out by heating the diamine and the adduct for about 4 to 20 hours at temperatures within the range of 100° C. to 200° C. in the molecular proportions illustrated in the examples below. The duration of the heating may be shorter or longer depending on the temperature, i. e., the shorter period corresponding to the higher temperature. It is only necessary to heat until the desired resinous products are formed.

The following specific examples illustrate the invention.

The term "long chain fatty acid" or "higher fatty acid" as employed in this specification and claims refers to an aliphatic carboxylic acid containing an unbroken chain of at least 7 carbon atoms bonded to a carboxyl group.

EXAMPLE 1

*Condensation of itaconic anhydride and methyl linoleate*

Methyl linoleate (42 g.; 1 mol.) and itaconic anhydride (32 g.; 2 mols.) were heated for 8 hours at 200° C. in an atmosphere of carbon dioxide. About 25 g. of benzene was used to rinse the apparatus, giving a total of 90 g. of the benzene solution of the reaction mixture which was separated from about 6 g. of a resinous material insoluble in benzene. Benzene solution was analyzed and the solution was found to contain 17.2 g. of unreacted itaconic acid, indicating that about 46 percent of the anhydride had reacted. The benzene solution was then distilled, first at atmospheric pressure to remove benzene and then at 5 mm. to a pot temperature of 240° C. to remove unreacted itaconic anhydride and methyl linoleate. The observed neutralization equivalent of the polymeric adduct was 232.

EXAMPLE 2

*Condensation of citraconic anhydride and methyl linoleate*

This condensation was conducted with the same weights of reactants and by essentially the same procedure as the itaconic condensation. One modification was made in that benzene used for rinsing the apparatus was removed before determination of unreacted anhydride. The reaction mixture was found to contain 9.8 g. of unreacted citraconic anhydride. It was distilled at 10-mm. pressure to a pot temperature of 250° C. The observed neutralization equivalent of the polymeric adduct was 230.

EXAMPLE 3

*Preparation of polyamides*

The polymeric adduct (2.3 g.) from each of Examples 1 and 2 was mixed with 2.1 ml. of 70.1 per cent aqueous ethylene diamine and heated to 170° C. with constant stirring in an atmosphere of nitrogen. The polyamides thus produced were tough, fusible, brown, translucent resins.

Employing the observed neutralization equivalents as numerically equal to one half the molecular weights of the adducts of Examples 1 and 2, it is found that 5 molecular proportions of diamine per molecular proportion of adduct are required for our novel products.

EXAMPLE 4

*Preparation of a polyamide from monomeric distillate*

The sample of monomeric distillate used had an iodine value of 90.4 and contained 11.7 percent of saturated ester, 67.2 percent of oleate, and 11.3 percent of linoleate determined spectrophotometrically. It contained 4.8 percent of diene conjugation. The amount of citraconic anhydride used was calculated on the mole-per-mole basis, assuming an average molecular weight of 296.5 for monomeric distillate. Inasmuch as the saturates present should not react, this procedure gave approximately 17 percent excess over the amount equivalent to the reactive components.

A 50-g. sample of the monomeric distillate and 18.9 g. of citraconic anhydride were heated for 8 hours at 200° C. in an atmosphere of nitrogen. Unreacted material (50.3 g.) was removed by distillation at 0.3–0.4 mm. pressure. The residue of condensation product (15.6 g.) had an iodine value of 63, a neutralization equivalent of 326, and contained 6.2 percent unreacted citraconic anhydride.

A mixture of 2.5 g. of this condensation product and 1.7 g. of a 69 percent aqueous solution of ethylene diamine was heated at 170°–180° C. for 20 hours. During this time the mixture was stirred by bubbling nitrogen through it. The product was a tough, tacky resin soluble in acetone and chloroform. Taking the observed neutralization equivalent as one half the molecular weight of the adduct, here again, 5 molecular proportions of diamine are required per molecular proportion of adduct for the polyamide resin product.

The ethylene diamine of the above examples may be replaced by hexamethylene diamine, dioctadecapolyenylamine, or diethylenetriamine. The methyl esters may in each case be replaced by the corresponding ethyl, propyl, butyl, glycol or glyceryl esters, or by the corresponding free higher fatty acids.

We claim:

1. A process for producing a synthetic resin comprising reacting one molecular proportion of an adduct of the group consisting of an unsaturated fatty acid containing at least 7 carbon atoms, an ester of such an acid, mixtures of said acids, and mixtures of said esters, with an anhydride selected from the group consisting of citraconic anhydride and itaconic anhydride, with approximately five molecular proportions of a hydrocarbon primary diamine at a temperature of from 100° C. to 200° C. until a fusible linear resin is formed, the unsaturation of said acid and ester being ethylenic bonds solely.

2. The process of claim 1 wherein the adduct is itaconic anhydride-methyl linoleate adduct.

3. The process of claim 1 wherein the adduct is citraconic anhydride-methyl linoleate adduct.

4. The process of claim 1 wherein the adduct is citraconic anhydride-monomeric distillate adduct.

5. The process of claim 1 wherein the diamine is ethylene diamine.

6. The process of claim 1 wherein the adduct is itaconic anhydride-methyl linoleate adduct and the diamine is ethylene diamine.

7. The process of claim 1 wherein the adduct is citraconic anhydride-monomeric distillate adduct and the diamine is ethylene diamine.

8. A fusible linear resin comprising the reaction product of approximately five molecular proportions of a hydrocarbon primary diamine with one molecular proportion of an adduct of an unsaturated fatty acid ester containing at least 7 carbon atoms with an anhydride selected from the group consisting of citraconic anhydride and itaconic anhydride, the unsaturation of said ester being ethylenic bonds solely.

9. The resin of claim 8 wherein the adduct is citraconic anhydride-methyl linoleate adduct.

10. The resin of claim 8 wherein the adduct is itaconic anhydride–methyl linoleate adduct.

11. The resin of claim 8 wherein the adduct is citraconic anhydride-monomeric distillate adduct.

12. The resin of claim 8 wherein the adduct is itaconic anhydride-methyl linoleate adduct and the diamine is ethylene diamine.

13. The resin of claim 8 wherein the adduct is citraconic anhydride-monomeric distillate adduct and the diamine is ethylene diamine.

HOWARD M. TEETER.
JOHN C. COWAN.

References Cited in the file of this patent

UNITED STATES PATENTS

| Number | Name | Date |
| --- | --- | --- |
| 2,149,286 | Graves | Mar. 7, 1939 |
| 2,366,128 | Root | Dec. 26, 1944 |